United States Patent
Greene

[11] Patent Number: 5,874,673
[45] Date of Patent: Feb. 23, 1999

[54] AIR SPEED AND DIRECTION INDICATING SYSTEM FOR ROTARY WINGED AIRCRAFT

[75] Inventor: Leonard M. Greene, Scarsdale, N.Y.

[73] Assignee: Safe Flight Instrument Corporation, White Plains, N.Y.

[21] Appl. No.: 839,394

[22] Filed: Apr. 11, 1997

[51] Int. Cl.[6] ............................................. G01C 21/12
[52] U.S. Cl. ............................ 73/178 H; 73/170.02; 73/170.11
[58] Field of Search ............................ 73/178 H, 170.02, 73/170.11

[56] References Cited

U.S. PATENT DOCUMENTS

| | | |
|---|---|---|
| 2,524,747 | 10/1950 | Ayres et al. . |
| 2,531,521 | 11/1950 | Link . |
| 2,952,154 | 9/1960 | Traksel . |
| 3,332,282 | 7/1967 | Daw . |
| 3,589,831 | 6/1971 | Lemnios .................................. 416/24 |
| 3,638,885 | 2/1972 | Reed ..................................... 244/17.27 |
| 3,726,139 | 4/1973 | Beilman .................................... 73/181 |
| 4,334,823 | 6/1982 | Sharp ...................................... 416/119 |
| 4,360,888 | 11/1982 | Onksen et al. .......................... 364/565 |
| 4,648,269 | 3/1987 | Durand .................................... 73/178 |
| 4,697,986 | 10/1987 | David ...................................... 416/114 |
| 4,766,767 | 8/1988 | Hassenpflug et al. .................... 73/181 |
| 4,893,261 | 1/1990 | Flint, III et al. ........................ 364/565 |
| 5,063,777 | 11/1991 | Arethens et al. .......................... 73/178 |
| 5,229,956 | 7/1993 | Daniell et al. .......................... 364/567 |
| 5,239,468 | 8/1993 | Sewersky et al. .................. 364/424.03 |
| 5,440,193 | 8/1995 | Barrett .................................... 340/328 |

Primary Examiner—Joseph L. Felber
Attorney, Agent, or Firm—Dougherty & Troxell

[57] ABSTRACT

An airspeed and direction indicating system for an aircraft of the rotary wing type includes a vertical accelerometer for monitoring the up and down movement of an outer portion or tip of the rotary wing. The vertical accelerometer produces a generally sinusoidal signal in response to the up and down movement of the wing tip as it rotates about an axis. The amplitude of the signal corresponds to the airspeed and the phase angle indicates direction. Suitable readouts display the information for consideration by a pilot.

10 Claims, 4 Drawing Sheets

AIR SPEED AND DIRECTION INDICATING SYSTEM FOR ROTARY WINGED AIRCRAFT

FIELD OF THE INVENTION

The present invention relates to an air speed indicating system and more particularly to an air speed and direction indicating system for rotary winged aircraft.

BACKGROUND FOR THE INVENTION

Rotary winged aircraft or helicopters as they are more commonly known comprise a generally vertical rotor or must having a lower end held within a fuselage. They also include a plurality of wings or blades which rotate with the rotor. These rotating wings cause the aircraft to travel vertically, forward, backward and sideways. The action of the blades upon the air result in a movement downward therefrom of a turbulent column of air which engulfs the fuselage as well as any Pitot and static tubes which are placed thereon to give airspeed indications.

It is also known in the art of sensing aircraft speed and direction to place a pressure sensor at the end of a rotating wing and to interpret the pressure variations which occur as a result of aircraft movement through an air mass to provide airspeed and direction signals. For example, a U.S. Pat. No. 3,332,282 of D. F. Daw discloses a pressure sensor probe at the tip of one of the helicopter's rotor blades. As the blade rotates, the amplitude of the cyclic variation of the blade tip pressure per revolution is a function of the translational speed of the helicopter. The cyclic variation is converted into an electrical signal which is passed through an inductive coupling using a pair of coils. By positioning the coils at right angles with respect to one another and in a known position with respect to the longitudinal axis of the aircraft, any component of the translation speed may be determined and from component measurements, the resultant translational direction with respect to the aircraft's axis can be derived.

A more recent patent of Onksen et al. U.S. Pat. No. 4,360,888 discloses an omni-directional airspeed system which calculates airspeed from a differential pressure signal. The differential pressure signal is indicative of the pressure difference between two rotating pitot-type sensors which are mounted at the ends of the hollow tubular arms. At airspeed other than zero, the velocity of the air through the sensors varies sinusoidally, with maximum difference when the sensor arms are aligned perpendicular to the wind. At that instant, the velocity of the sensor advancing into the wind is equal to the tip speed plus the airspeed, and the velocity of the air in the sensor retreating from the wind is equal to the tip speed minus the airspeed. The resultant pressure in the two hollow tubes are then different and the transducer outputs a voltage proportional to the differential pressure and proportional airspeed. Then, when the arms are aligned parallel to the wind, the wind velocity in the sensors are equal and the differential pressure output equals zero. The resultant wave form from the differential transducer is sinusoidal, with amplitude related to airspeed and phase related to direction.

An improvement in the aforementioned devices is disclosed in the U.S. Pat. No. 4,893,261 of Flint III, et al. As disclosed therein, aircraft speed and direction are determined by sampling the sinusoidal-like pressure variations at the end of a rotor and performing a Fourier analysis on the pressure samples.

It is presently believed that there is a relatively large commercial market for an improved airspeed and direction indicating system for rotary winged aircraft. It is believed that there is a demand for such systems which eliminates pressure sensor and pressure transducers, are highly reliable, relatively easy to install and service and which can be manufactured and sold at a competitive price. It is also believed that the airspeed and direction indicating system in accordance with the present invention provides all of the aforementioned benefits and more as will become evidence from the following description.

BRIEF SUMMARY OF THE INVENTION

In essence, the present invention contemplates an airspeed and direction indicating system for rotary winged aircraft. The system eliminates the need for pressure sensors such as pitot tubes which may be susceptible to damage and pressure transducers. The system incorporates means such as a vertical accelerometer disposed on or in an outer portion of a rotary wing for determining variations in the deflections of the wing. Deflections refer to the up and down movement along an axis which is essentially perpendicular to the plane of rotation. To be more specific, the vertical accelerometer measures the up and down acceleration of an outer portion of the rotary wing i.e., a wing tip in a direction which is generally parallel to the shaft upon which the wing rotates. The vertical accelerometer produces a generally sinusoidal signal having an amplitude which corresponds to the airspeed of the aircraft. The system also includes means such as an analogue gauge or digital output for indicating airspeed so that the pilot is apprised of the airspeed. In addition, the systems includes means for comparing the phase shift or phase angle, for example, the relationship of the signal to the revolutions of the rotatable wing to thereby determine the airspeed direction of the aircraft and means for indicating direction for a pilots consideration.

A system for measuring the airspeed and direction of a rotary winged aircraft in accordance with one embodiment of the invention includes a shaft and a pair of opposed rotary wings which rotate about the shaft. Each of the rotating wings include an inner portion which is adjacent to the shaft and an outer portion which forms or is adjacent to the wing tip. The system also includes first and second vertical accelerometers which are disposed in the outer portions of the rotating wings. The vertical accelerometers are constructed and arranged for measuring the acceleration of the up and down movement of the wing tips in a direction which is generally parallel to the shaft. As a result, the accelerometers produce an oscillating signal in response to a so called vertical movement of the wing tips assuming rotation of the wings in a generally horizontal plane.

The two vertical accelerometers may also be used as a dual system wherein each vertical accelerometer is used independent of the other so that there is a backup in the event of a failure of one system.

The invention also contemplates a system which includes means for subtracting one vertical signal from a second vertical signal to produce a resultant signal. This resultant signal represents the difference in the two amplitudes. In other words, the resultant signal is an indication of the differences in accelerations normal to the plane of rotation. Thus, the resultant oscillation i.e. a generally sinusoidal signal corresponds to the airspeed of the aircraft. Calibration means and a read out are also provided in order to display the airspeed to a pilot. In addition, means are provided for comparing the phase relationship of the generally sinusoidal signal to a fixed reference as an indication of direction.

Subtracting the vertical signal from one rotating wing such as the down wind wing from the signal from the up wind wing offers significant advantages. For example, at zero airspeed, the signals from oppositely disposed wings or blades will zero out through 360° rotation. This approach eliminates any problem of tare values. In addition, having a vertical accelerometer in each of the rotating wings avoids problems associated with one wing being out of balance with another. Furthermore, the approach provides a more accurate airspeed indication at very low airspeed i.e. as airspeed approaches zero.

The invention also contemplates an airspeed and direction indicating system for helicopters having three or other odd number of rotating wings. With three bladed helicopters having an accelerometer in each blade, a phase correction will be made to compensate for the fact that the up wind position of one blade is not directly opposite a blade in a down wind position. In such cases, the phase correction may be made by time shifting the signals as will be well understood by a person of ordinary skill in the art.

The invention will now be described in connection with the accompanying drawings wherein like references numerals have been used to indicate like parts.

DETAILED DESCRIPTION OF THE PREFERRED EMBODIMENTS OF THE INVENTION

Figure 1:
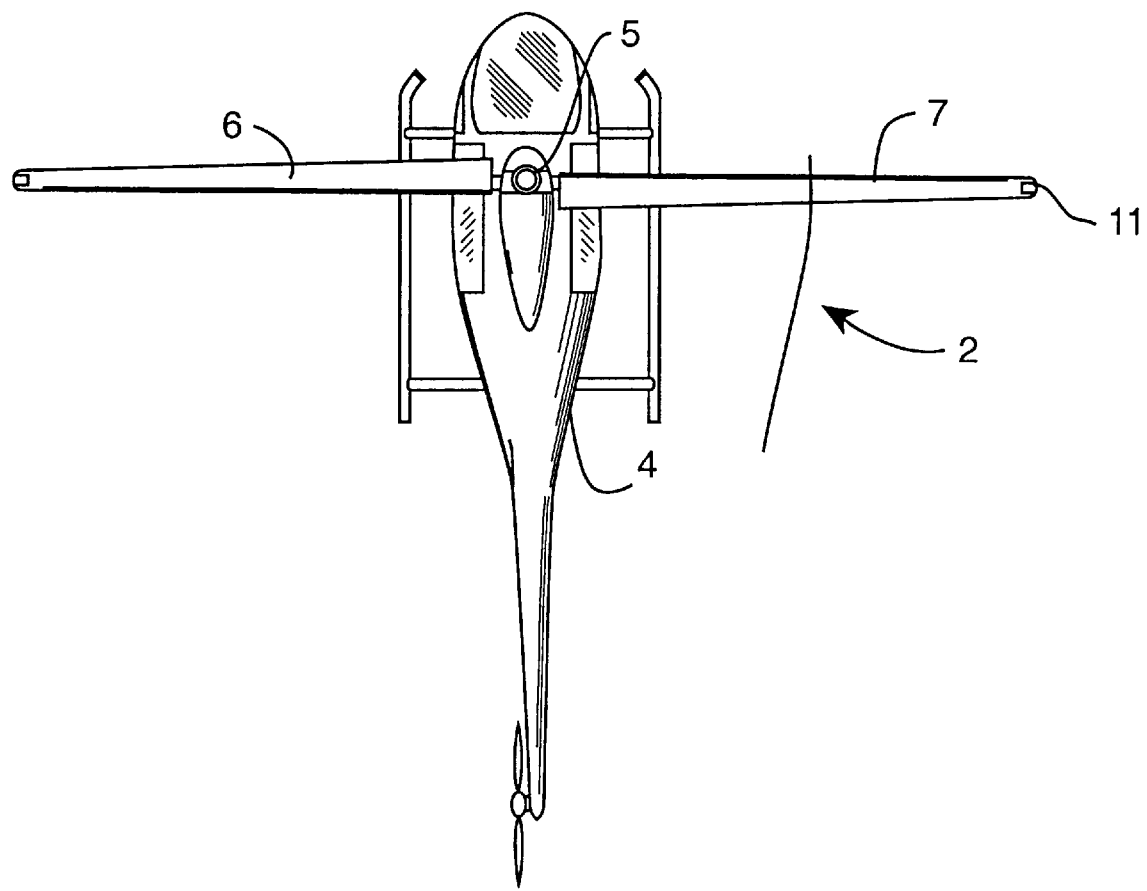
FIG. 1 is a top or plan view of a helicopter having a pair of opposed rotary wings or blades which show the positioning of a pair of vertical accelerometers in accordance with one embodiment of the invention.

As shown in FIG. 1, a rotating wing aircraft such as a helicopter 2 includes a fuselage 4, a mast or rotor 5 and a pair of opposed blades, a rotating wing's 6 and 7 which rotate about the rotor 5 in a conventional manner. In such aircraft it is possible to have an airspeed equal to zero which is referred to as "hovering". In such a case, it will be apparent that the airspeed of a rotating wing is constant during an entire revolution, assuming of course, it is rotated at a constant speed. However, if the aircraft has an airspeed in one direction, the airspeed of a rotating wing will vary during each revolution. This is due to the fact that during one half of a revolution, the speed of the aircraft will be added to the speed of the wing and during a second half of each revolution the airspeed of the aircraft will be subtracted from the speed of the wing.

Figure 2:
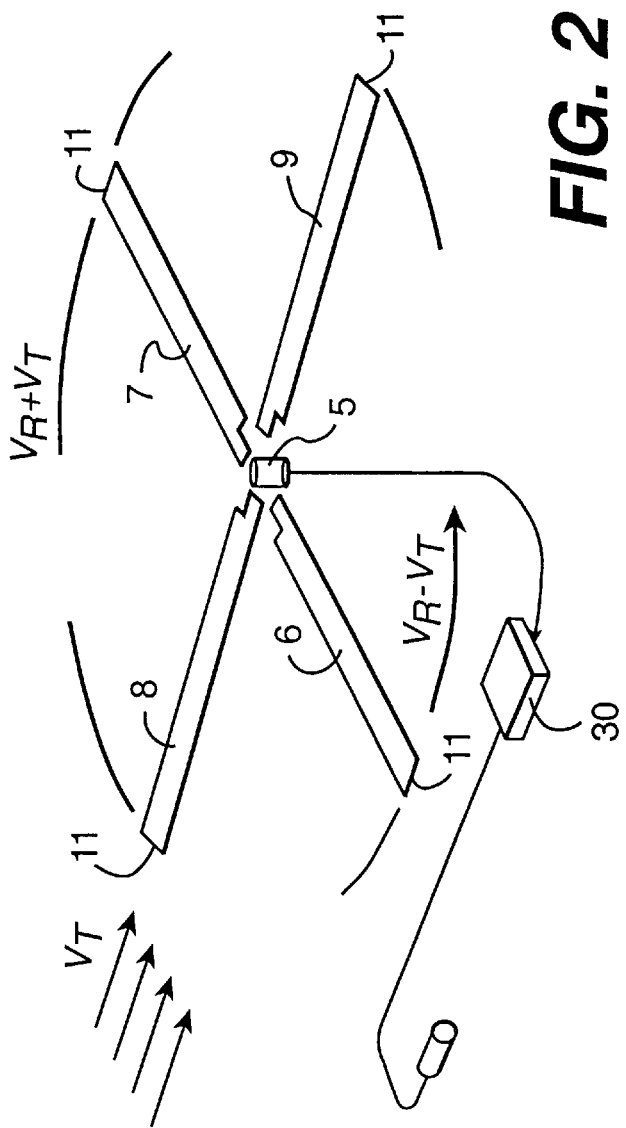
FIG. 2 is a stylized illustration of a helicopter's rotary wings rotating in an airmass upon a fuselage (not shown) which is in motion relative to an airmass.
Figure 3:
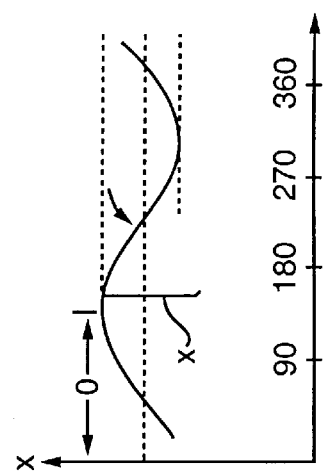
FIG. 3 is a plot of the vertical acceleration sensed at the tip of a rotary wing.

FIG. 2 illustrates a helicopter rotor 5 which rotates at a given speed in a counterclockwise direction as viewed from above. The helicopter to which the rotor is attached is moving within and with respect to an airmass at a velocity $V_T$ as manifested by a "wind" advancing in the direction shown. Accordingly, the airspeed of rotating wing 5 when it is perpendicular to the wind will equal the speed of rotation $V_R$ plus the velocity of the wind $V_T$. Similarly, the airspeed of the rotary wing at the instant when it is perpendicular to the wind and moving in the opposite direction is the velocity of rotation $V_R$ minus the velocity of the wind $V_T$. At the same time, the velocity of rotating wings 8 and 9 will not be effected by the wind speed since the wings are aligned with or parallel to the direction of the wind.

From the above, it is apparent that the airspeed of the wing varies substantially sinusoidally and that the amplitude of the sinusoidal variation is dependent upon the airspeed of the helicopter 2. Furthermore, the direction of the airspeed relative to the heading of the helicopter 2 determines the phase relationship of the sinusoidal variations and airspeed of the wing to the revolution of a shaft 10 which drives rotor 5. These principles form the basis for the present invention as will become apparent from the following description of the preferred embodiments.

An airspeed and direction indicating system for rotary winged aircraft in accordance with a preferred embodiment of the invention incorporates a vertical accelerometer 10 which is disposed in an outer portion as for example at or near the wing tip of one or more of the rotary wings 6, 7, 8 and 9. The vertical accelerometer 10 measures the vertical accelerations of the tip 11 of rotary wing 6 along an axis which is essentially perpendicular to the plane of rotation i.e., parallel to a shaft 12 upon which the rotor 5 rotates.

Figure 4:
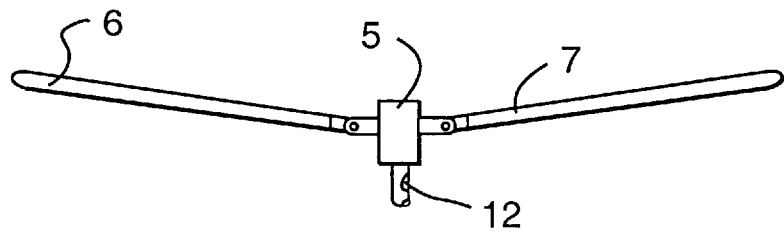
FIG. 4 is a diagrammatic elevational view which illustrates the position of the rotary wings of the helicopter in FIG. 1 during a period of lift at zero airspeed.
Figure 5:
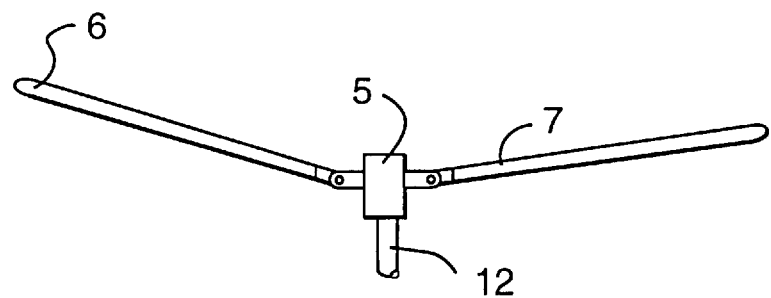
FIG. 5 is a view similar to that shown in FIG. 4, but illustrating the positions of the rotating wings when the helicopter is moving in a direction which is perpendicular to the plane of the paper.

In most modern helicopters, the rotary wings are pivotally mounted to provide movement relative to a plane perpendicular to its axis of rotation. As the wing rotates during motion of the aircraft, the airspeed of the aircraft causes the lift of the rotating wing in one position to be greater than that in a diametrically opposite position. Therefore, if the wing was not pivoted, as illustrated in FIGS. 4 and 5 the difference in lift would tend to flip the helicopter over or cause it to rotate about its longitudual axis i.e. an axis through the center of the fuselage assuming that the helicopter is traveling in a direction along that axis.

Figure 6:
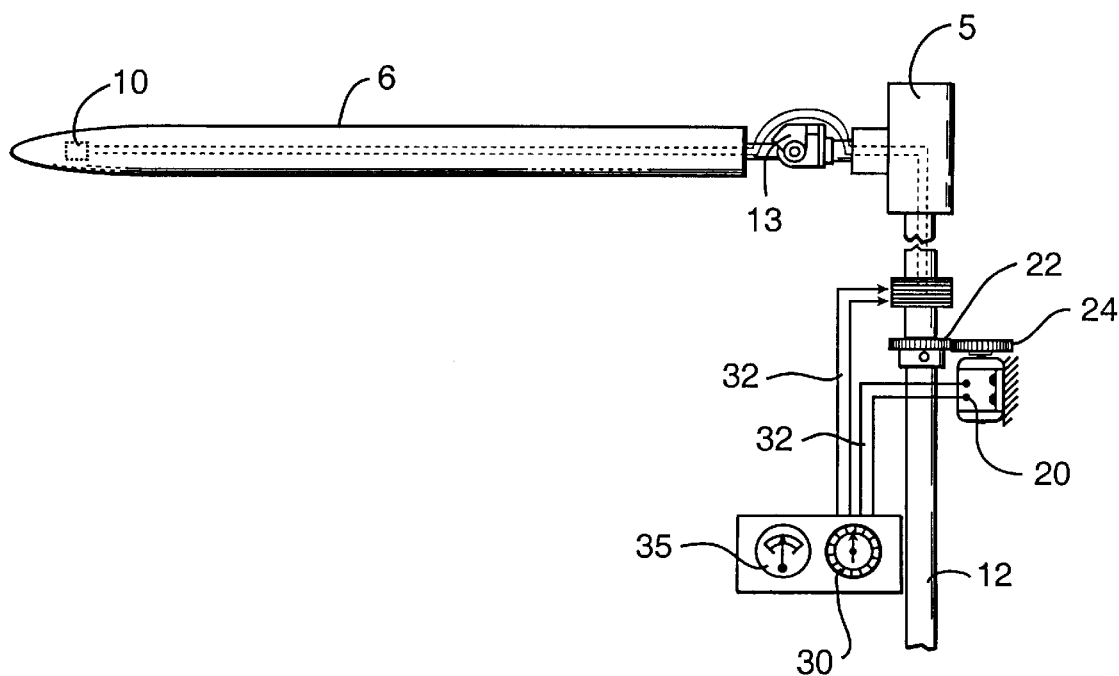
FIG. 6 is an elevational view of a helicopter rotor and rotary wing together with airspeed and direction indicators.

However, when the wing is pivoted it assumes an equilibrium position depending upon the relative amount of the centrifical and lift forces acting on the wing. As shown in FIG. 4, rotating wings 6 and 7 are pivotally mounted on a hub or rotor 5 which is rotated by the shaft 12. The wings 6 and 7 rotate about the axis of the shaft 12 and move about the axis on the pivot 13 (FIG. 6). When the aircraft is "hovering" i.e. if the aircraft has zero airspeed, the wings 6 and 7 and wing tip 11 will remain in the same position relative to a plane perpendicular to the axis of rotation i.e., the axis of shaft 12. Therefore, the wing 6 and wing 7 has the same angular position relative to a plane perpendicular to the axis of the rotation as it rotates through 360°.

However, when the aircraft is moving in a line perpendicular to the plane of the paper, the airspeed of the wing is increased on one side of the axis of rotation and decreased on the other. This causes the lift of wing 6 as shown in FIG. 5 to be greater in the lift on wing 7. The vertical accelerometer 10 produces a signal in response to the displacement of the tip 11 of the wing.

An indication of the air direction of the aircraft may be obtained by comparing the phase of the sinusoidal signal produced by the accelerometer 10 with the revolutions of the shaft 12. For example, as shown in FIG. 6, a signal generator 20 is driven by the shaft 12 through gears 22 and 24 to produce a signal. The signal will then have a fixed phase relationship with the revolutions of the shaft 12. The signal is then fed to a phase meter 30 which acts as an air direction indicator by comparing the reference signal from the generator 20 with a signal produced by the accelerometer 10 in a conventional manner as will be well understood by a person of ordinary skill in the art. As shown in FIG. 6, the signal from the accelerometer 10 is connected to phase meter 30 by means of leads 32. An airspeed indicator 35 and phase meter 30 must, of course, be suitably calibrated to provide an accurate indication of airspeed based on the amplitude of the signal from the accelerometer and the direction based on a phase angle. This calibration and the circuitry are conventional.

The invention also contemplates a method for determining the airspeed and direction of a rotary wing aircraft, such as a helicopter. Such aircraft have a generally vertical shaft i.e. vertical when the aircraft is in generally level flight and a rotary wing which rotates at a relatively constant speed in a generally horizontal plane. In referring to a generally horizontal plane, it should be recognized that the aircraft may during banking or other maneuvers depart from the generally vertical axis of the shaft and horizontal plane of rotation, however the frame of reference is used to indicate the up and down movement of a wing tip with respect to the shaft i.e., generally parallel to the shaft and generally perpendicular to the plane of rotation. It should also be recognized that the so called plane of rotation is not strictly a plane since the rotary wing may be pivotally mounted to provide for the up and down movement of the outer portions of the wing or wing tip.

The method, in accordance with the invention, comprises the step of continuously monitoring the up and down movement of an outer portion or tip of the wing. For example, a vertical accelerometer which is mounted inside of a wing and is as close to the wing tip as possible may be used to measure the up and down displacement of the wing tip as it rotates about the shaft. The method also includes the step of producing a generally sinusoidal signal in response to the up and down movement of the wing tip. In this case, the amplitude of the signal corresponds to the airspeed and the phase angle indicates the direction of the aircraft. The method may also include a calibration step for converting the amplitude of the signal to airspeed and the phase angle to direction. Finally, the method includes the step of indicating or displaying in analogue or digital form the airspeed and direction for consideration by a pilot.

Calibration means such as a gyroscope and suitable circuit may also be utilized to compensate for the bank of the aircraft during turns and other maneuvers. The selection of a gyroscope and suitable circuit may be of generally conventional design and will be well understood by those of ordinary skill in the art.

While the invention has been described in connection with its preferred embodiments, it should be recognized that changes and modifications may be made therein without departing from the scope of the appended claims.

What is claimed is:

1. An airspeed and direction indicating systems for an aircraft of the type having a generally vertical shaft and a rotating wing which rotates about the shaft in a generally horizontal plane, said system comprising means for monitoring the up and down movement of an outer portion of said rotating wing as said rotating wing rotates about said shaft, means for producing a generally sinusoidal signal in response to the up and down movement of the outer portion of the wing wherein the amplitude of said signal corresponds to airspeed and the phase angle corresponds to direction, and means for displaying the speed and direction of the aircraft for consideration by a pilot.

2. An airspeed and direction indicating system for an aircraft of the type having a generally vertical shaft and a rotary wing which rotates about the shaft in a generally horizontal plane in accordance with claim 1 in which said means for monitoring the up and down movement includes a cervical accelerometer disposed in an outer portion of said rotating wing.

3. A airspeed and direction indicating system for an aircraft of the type having a generally vertical shaft and a rotatry wing which rotates about the shaft in a generally horizontal plane in accordance with claim 1 in which said means includes a vertical accelerator mounted at the tip of a rotating wing.

4. An airspeed and direction indicating system for an aircraft of the type having a rotating wing, said system comprising a cervical accelerometer for determining variations in the airspeed of said wing and for producing a generally sinusoidal signal having an amplitude which corresponds to the airspeed of the aircraft, means for indicating the airspeed of the aircraft in response to said signal and means for comparing the phase relationship of said signal to a reference to thereby determine the air direction of the aircraft and means for indicating the direction of the aircraft with respect to a reference.

5. An airspeed and direction indicating system according to claim 4, which includes a shaft and at least two rotating wings and a vertical accelerometer disposed in an outer portion of each of said rotating wings for producing generally sinusoidal signals in response to the up and down movement of the outer portion of the rotating wing in a direction which is generally parallel to said shaft.

6. A system for measuring the airspeed and direction of a rotary winged aircraft having a shaft, first and second rotating wings which rotate about the shaft and in which each of said rotating wings includes inner and outer portions with said inner portions adjacent to said shaft, said system comprising first and second cervical accelerometers disposed in said outer portions of said first and second of said rotary wings respectively for sensing the oscillating movement of said outer portions of said rotating wings in a direction generally parallel to said shaft as said wings rotate about said shaft and means for producing an oscillating signal in response to any such movement wherein the amplitude of the signal corresponds to the airspeed of the aircraft, and means for indicating the airspeed of the aircraft, means for comparing the phase relationship of said signal to the revolutions of said shaft to thereby determine the air direction of the aircraft and means for indicating the direction of the aircraft for a pilot's consideration.

7. An airspeed indicating system for a rotary winged aircraft comprising a shaft and two opposed rotary wings rotatably mounted on said shaft and a vertical accelerometer carried by each of said rotary wings on an outer portion thereof, each of said vertical accelerometers constructed and arranged to produce a generally sinusoidal signal in response to the accelerations of said outer portions of said rotary wings in a direction which is generally parallel to said shaft, means for summing said signals to obtain a differential or resultant signal which corresponds to the airspeed of said aircraft and means for indicating the airspeed of the aircraft.

8. An airspeed indicating system according to claim 7, which includes means for comparing the phase relationship of said signal to the revolutions of said rotatable wings to thereby determine the air direction of the aircraft and means for indicating the direction of the aircraft.

9. A method for determining the airspeed and direction of a helicopter or the like having a rotary wing which rotates at a relatively constant speed in a generally horizontal plane about an axis which is generally perpendicular to the plane of rotation, said method comprising the steps of continuously monitoring the vertical accelerations of an outer portion of a wing and producing a generally sinusoidal signal in response to changes in the vertical accelerations of the outer portions of the wing, detecting the amplitude and phase of the signal as a measure of the airspeed and direction of movement through an airmass respectively and displaying the airspeed and direction for consideration by a pilot of the helicopter or the like.

10. A method for determining the airspeed and direction of a helicopter or the like according to claim 9, in which the vertical acceleration of each of two oppositely disposed rotary wings are monitored.

\* \* \* \* \*